United States Patent [19]

van der Kolk

[11] Patent Number: 4,493,288

[45] Date of Patent: Jan. 15, 1985

[54] CONTINUOUS PET LITTER CLEANING APPARATUS

[76] Inventor: Donald van der Kolk, 229 Shore Rd., Mt. Sinai, N.Y. 11766

[21] Appl. No.: 513,817

[22] Filed: Jul. 15, 1983

[51] Int. Cl.³ .................................................. A01K 29/00
[52] U.S. Cl. ................................................................ 119/1
[58] Field of Search ........................................... 119/1

[56] References Cited

U.S. PATENT DOCUMENTS

| | | | |
|---|---|---|---|
| 3,071,110 | 1/1963 | Fox | 119/1 |
| 3,316,880 | 5/1967 | Jungles et al. | 119/1 |
| 3,621,817 | 11/1971 | Printz | 119/1 |
| 3,937,182 | 2/1976 | Kamimura | 119/1 |
| 3,954,086 | 5/1976 | Maness | 119/1 |
| 4,027,625 | 6/1977 | Wheeler | 119/1 |
| 4,096,827 | 6/1978 | Cotter | 119/1 |

Primary Examiner—Gene Mancene
Assistant Examiner—Kris R. Schulze
Attorney, Agent, or Firm—Kevin Redmond

[57] ABSTRACT

A device for continuously cleaning the litter in a litter pen by removing the old, used litter automatically as the animal uses the litter box. The number of litter changes is greatly reduced and the amount of litter wasted is also reduced.

16 Claims, 7 Drawing Figures

CONTINUOUS PET LITTER CLEANING APPARATUS

BACKGROUND

1. Field

This invention relates to litter cleaning apparatus and, more particularly, to such apparatus intended to automatically change the litter within a litter box.

2. Prior art

FIG. 1 shows a prior art litter box 101 containing litter 102. In the operation of such a box, the animal normally urinates on the top of the litter and the urination penetrates in a narrow area such as 103 and spreads out in the litter as it saturates the bottom of the box as shown by drawing numeral 104. Repeated uses of the litter box produce a second column 105, and an expanded area at the bottom 106. As the litter is nearly consumed, the urine forms spread-out-areas near the top of the litter such as 107, at which point the odor increases and the litter must be removed. Unfortunately, if the animal persists in using one area of the box, the litter is used up in that area faster and the odor is detected sooner. Where the entire litter is changed at such times, a good portion of the litter is wasted. In such cases, it is often necessary to clean the litter box one or more times a day.

SUMMARY

It is an object of the present invention to prevent odors escaping from urine-saturated litter in a litter box.

It is an object of the present invention to provide an apparatus for automatically changing the used litter in a litter box and preventing the waste of unsaturated litter.

It is an object of the present invention to reduce the amount of litter normally used in a litter box.

The present invention includes a hopper which contains a store of unused litter, a litter box which has a downward sloping conveyor mechanism forming the bottom of the box and a repository container which collects used litter and excrement.

In the operation of this device, after use by an animal, the litter becomes saturated on the bottom of the accessible litter area and rests on the conveyor mechanism. The animal, upon entering the apparatus, passes over a step treadle. The weight of the animal on the treadle causes the treadle to be depressed which, in turn, incrementally moves the conveyor mechanism to slowly remove the lower, and usually most saturated layer of the litter. The lower layer of the litter is passed through a flap shutter and is dropped into a repository container which is located in an enclosing chamber to contain the odor of the spent litter.

In this process, the most used area of the litter is removed. As it is removed, it is also automatically replaced by gravity feed from the hopper and is spread out across the litter box area by the animal's scratching in the fresh litter to cover its excrement. This action by the animal also tends to move its excrements to the bottom of the litter where it will be disposed of first. Less litter is consumed and whatever amount is consumed is automatically placed in a repository, reducing the number of replacements and the time that must ordinarily be devoted to this task. The size of the repository container is sufficiently large to hold all the litter contained in the litter box and the hopper to prevent overloading, regardless of the time the device is left unattended.

Another advantage provided by the sloping bottom of the belt which is directed toward the exit flap, is that urine not absorbed by the litter will flow into the repository for easy disposal.

DETAILED DESCRIPTION OF THE INVENTION

Figure 1:
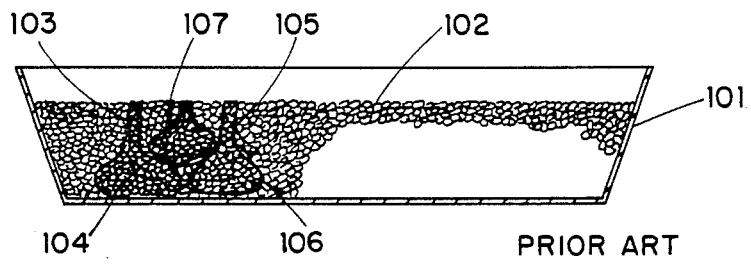
FIG. 1 is a cross sectional view of a prior art litter box.
Figure 2:
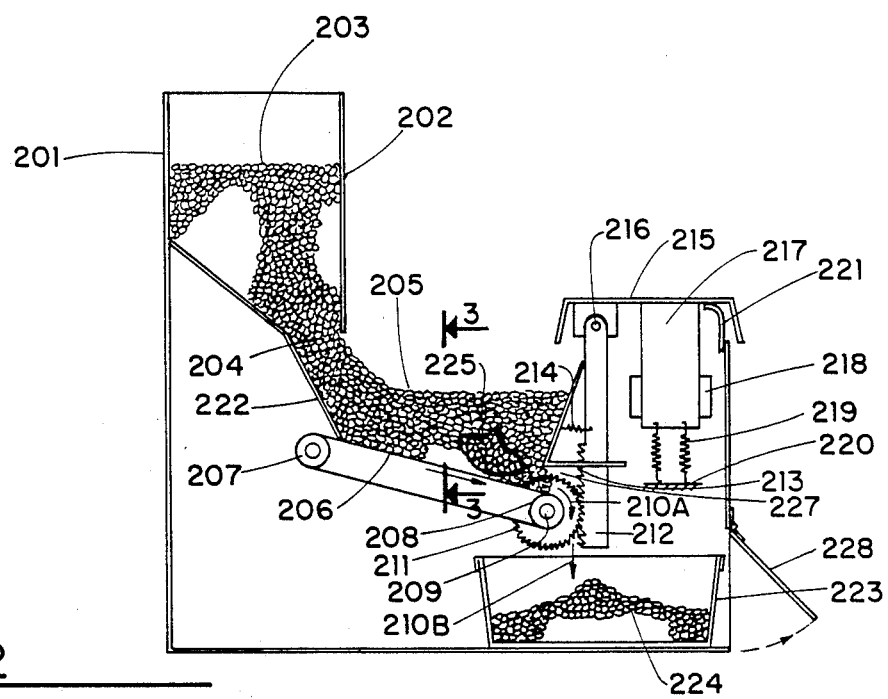
FIG. 2 is a cross sectional view of a first embodiment of the present invention.

FIG. 2 shows a cross sectional view of one embodiment of the present invention. The invention comprises a hopper 202 with a neck 204, a litter box 222 having a bottom formed of a conveyor belt 206 which rides on rollers 207 and 208, a repository 223 containing spent litter 224, a treadle 215, a drive arm 212, a drive gear 211, a drive shaft 209, an outer housing 201, a treadle guide 217, a treadle guide collar 218, a treadle guide spring 219, a treadle guide support 220, a repository seal 221, a drive arm spring 214, and a hinged repository-removal door 228.

In the operation of the device shown in FIG. 2, litter 203 is fed into the hopper 202. Gravity feed causes it to drop to the bottom of the hopper, through the neck 204 and into the litter box 222. As the animal enters the litter box, it must pass over a treadle 215 which is permitted to move downward under the weight of the animal and is held erect during this movement by guide 217 passing through guide collar 218. In the downward movement, the arm 212, which contains gear teeth 213 engages the teeth on gear 211 causing it and drive shaft 209, roller 208 and conveyor belt 206 to move incrementally. Incremental movement of the conveyor belt causes the congealed litter, such as litter 225, to be forced along the bottom of the litter box towards the exit flap 227 where it is dumped into a repository 223. The exit flap 227 is flexed and spring loaded so that it opens as congealed litter or feces is forced through it, but tends to close down when there is merely unused, soft litter against the flap and the belt is not moving. The gear 211 moves in the direction shown by arrow 210A. The congealed litter drops as shown by arrow 210B.

The arm 212 is pivoted at point 216 from the treadle 215 and is held in engagement against gear 211 by means of spring 214. The teeth on arm 213 are directed downward, while the teeth on gear 211 in the area of engagement are directed upward, making it possible for the teeth on the arm and the gear to engage and function in a normal manner during the downward stroke of the treadle. However, once the animal leaves the treadle, the springs 219 are biased to force the guide 217 and the treadle 215 upward, drawing along with them the arm 212. The arm 212 does not engage the gear 211 on the upward stroke because the teeth on the arm and the gear are now opposed and prevent engagement. The arm 212 is pulled away from engagement against the bias of the spring 214; however, once the arm 212 has reached its uppermost point in the travel with the treadle 215, it is again set to engage the gears and is pulled into engagement by spring 214.

Figure 3A:
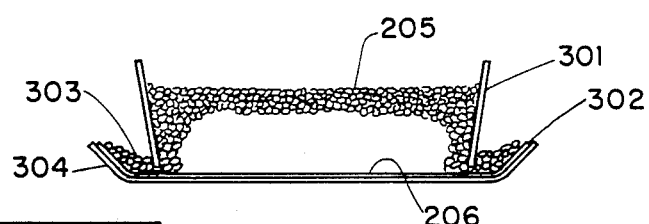
FIG. 3A is a detailed cross sectional view of a first design of the conveyor belt and litter box arrangement of the present invention.
Figure 3B:
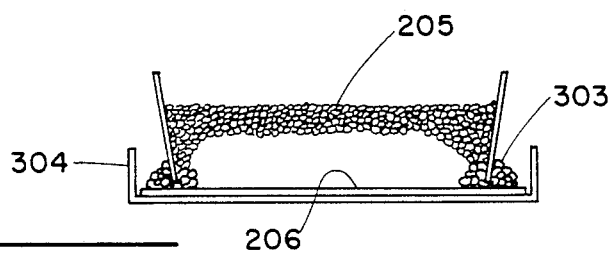
FIG. 3B is a detailed cross sectional view of a second design of the conveyor belt and litter box arrangement of the present invention.

FIGS. 3A and 3B shows cross sectional views of two embodiments of the litter box of FIG. 2, taken in a direction orthagonal to that shown in FIG. 2. In FIG. 3A, litter 205 is contained within the litter box 301 by the side walls and at the bottom of the box by the conveyor belt 206. To prevent the overflow of urine or other debris in the box, the conveyor belt 206 is forced past guides 304 which cause the side edges to curl upwards 302. The guides curl upwards past the conveyor belt, thus containing the litter box contents. Some litter extends under the litter box wall 301 and fills part of the area within the curled lip 302 to aid in absorbing any urination which leaks beyond the walls of the box.

In FIG. 3B, the structure is essentially the same as in 3A with the exception that the belt is not curled. Instead, the belt is made slightly wider and the guides extend upward beyond the belt to contain the litter 303 located outside the side walls. Urine leaking past the walls is captured by the wider area of litter 303, thereby eliminating the need to curl the belt.

Figure 4:
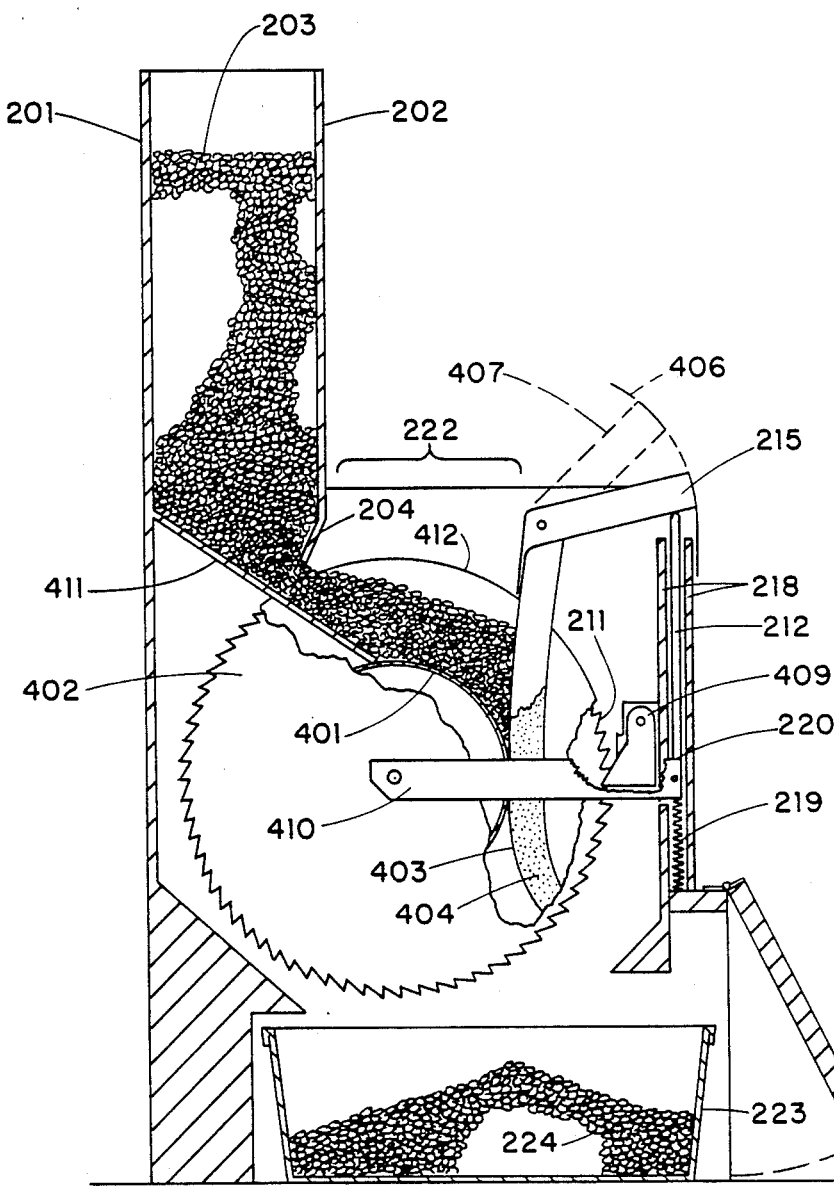
FIG. 4 is a cross sectional view of a second embodiment of the present invention, illustrating a removable treadle, a drum replacement for the conveyor belt and a second drive mechanism.

FIG. 4 shows a second embodiment of the present invention with the outside wall removed to expose the internal components. This embodiment comprises components similar to those of FIG. 2 in that it also includes a hopper 202 having a neck 204, and a litter box 222. Both the litter box and the hopper have bottom openings. However, in this embodiment, the closure for the lower opening of the litter box is formed by the surface of a rough-surfaced drum 401. This drum incorporates a first larger diameter disc 402 attached to one end of the drum, and a similar diameter disc 412 attached to its opposite end. The side walls of the litter box are formed by the extensions of the discs beyond the drum, a chute-like extension of the hopper 411 and a closure flap 403. The outer rim of the first disc 402, which contains the drive gear teeth 211, is broken away in FIG. 4 to show the drum and the flap. This drum arrangement replaces four components (the conveyor belt 206, rollers 207 and 208 and drive gear 211) previously required for the embodiment of FIG. 2.

The fundamental operation of the embodiment shown in FIG. 4 is similar to that shown in FIG. 2 in all respects except two: the drum 401 replaces the conveyor belt, rollers and drive gear, and it moves the bottom layer of congealed litter 225 under a waterproof, flexible flap 403. This flap is pressed against the roughened surface of the drum 401 by a soft spring mechanism 404, such as a soft sponge, thus preventing uncongealed litter from leaking into the repository 223 before the litter is utilized. The end discs of the drum prevent the litter box contents from spilling off the ends of the drum. The drum may be driven by the same type treadle mechanism described previously in connection with the embodiment of FIG. 2 or by the modification of the FIG. 2 mechanism shown in FIGS. 4 and 5A.

The drive mechanism shown in FIG. 4 differs from that of FIG. 2 in that the treadle 215 may be pivoted through the arc 406 to the position 407 shown in dotted lines in FIG. 4. A lever 410 is pivoted about the axis of rotation of the drum at one end and pivotally connected at its opposite end to the drive arm 212. A pall 409 is pivotedly connected to the lever for engagement with the gear teeth 211 during the down stroke of the treadle and disengagement on the up stroke. The single pall replaces all the teeth previously required on the drive arm 212 of FIG. 2. Instead of moving the entire drive arm out of disengagement with the gear teeth on the up stroke, only the pall is disengaged and this is accomplished easily by pivoting it away on its pivot connection to lever 410.

Figure 5A:
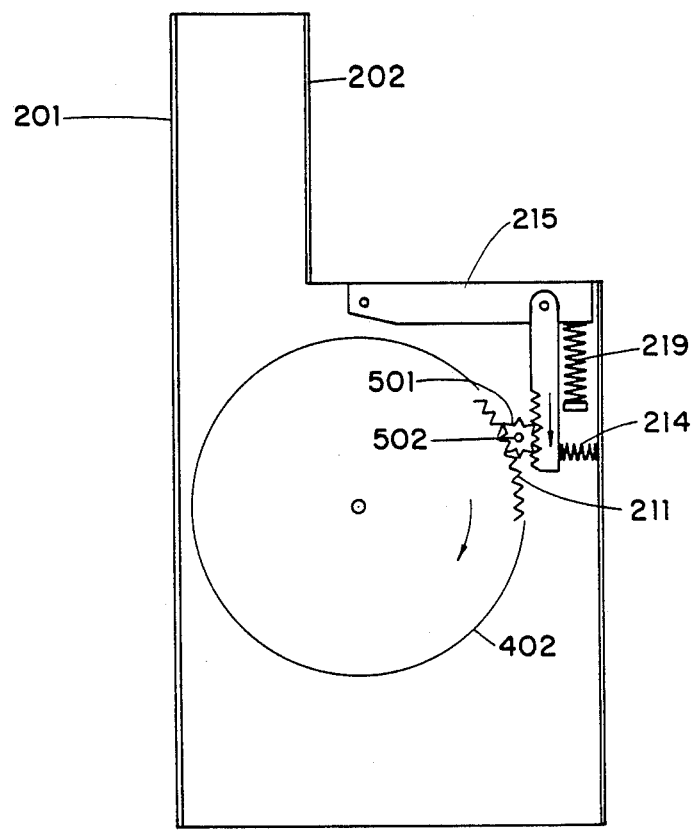
FIG. 5A is a cross sectional view of a third embodiment of the present invention, illustrating a third drive mechanism designed to actuate upon the departure of the animal.

FIG. 5A shows a second type of treadle-drive mechanism which may be utilized in either of the previously described embodiments of this invention. In the embodiment of FIG. 5A, actuation of the device is delayed in that the drive gear 211 incrementally advances the belt only as the treadle rises. This occurs as the animal moves its weight from the treadle on leaving the litter box. The advantage of this design over the previously described mechanisms is that the movement of the litter takes place as the animal leaves. Thus, the animal is not frightened by the movement of the litter on arrival. FIG. 5A shows a drive mechanism utilizing an idler drive gear 501 fixed (with respect to the frame) on its axis 502 and in contact with the previously described gear teeth 211. The idler is placed between the drive arm and the gear teeth so that the "reverse drive" produced on the up stroke of the drive arm is again reversed to drive the belt in the proper direction towards the closure.

Figure 5B:
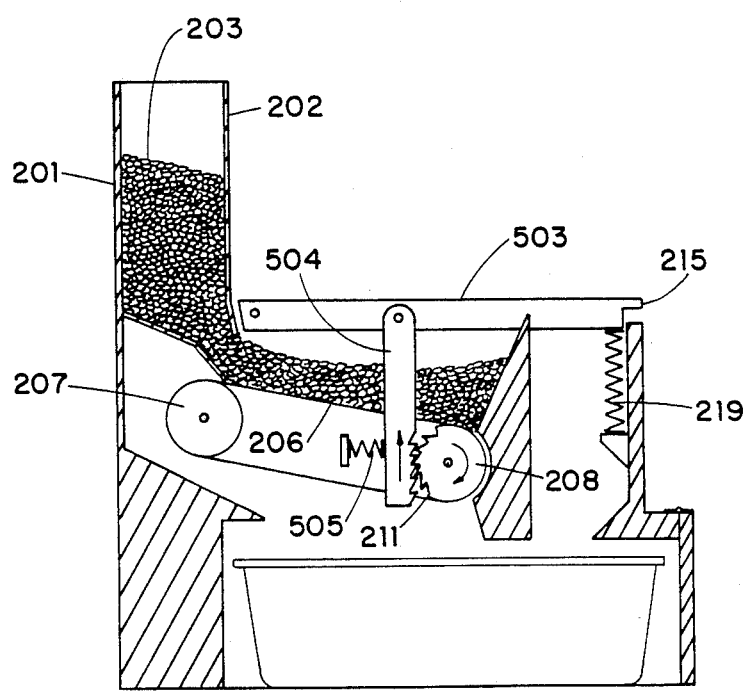
FIG. 5B is a cross sectional view of a fourth embodiment of the present invention, illustrating a fourth drive mechanism designed to actuate upon the departure of the animal.

FIG. 5B shows a drive mechanism driving the gear teeth from the middle of a different type of treadle arm formed of a second lever, the drive occurring with the rising of the treadle drive arm previously depressed by the animal's weight on the treadle-step. The treadle-step and treadle drive arm are caused to rise by the treadle drive springs as the animal leaves, incrementally advancing the drive gear as the treadle drive arm rises, to which the treadle drive teeth are engaged by the spring 505.

In the embodiment of FIG. 5B, the treadle rests on one end of a second layer 503 which is pivotedly connected at the end away from the treadle to the frame. A second drive arm 504 having teeth on one side is pivotly connected at its upper end to the second lever at a point generally midway between its ends in a position for the teeth on the arm 504 to engage the gear teeth 211, however, engagement is on the opposite side of the roller from that used for engagement in FIG. 2. This location of the drive arm permits correct drive direction of the gear and rollers on the upstroke without the need for an idler gear of FIG. 5A. To insure engagement only on the upstroke, the teeth of the second drive arm are directed upward while teeth 211 are directed downward. A spring 505 positioned between the second drive arm and the frame biases the second drive into engagement on the upstroke and permits disengagement of the teeth on the down stroke.

Several embodiments of the present invention have been disclosed for illustrative purposes only, none of which should be considered limiting, the broad principals of the invention, encompassing these and other equivalent embodiments, being limited only by the subtended claims.

Having described my invention, I claim:

1. Apparatus for removing spent animal litter, comprising:
   (a) a frame,
   (b) a treadle moveably mounted to said frame for accepting an animal's weight and said treadle positioned to move under the force of said weight,
   (c) an endless belt having an upper and a lower surface, said belt being positioned to support animal litter on its upper surface,
   (d) a first roller having an axis of rotation positioned generally horizontally, said first roller being rotatably mounted to said frame for rotation about its axis of rotation and at a location to support one end of said endless belt,
   (e) a second roller having an axis of rotation positioned generally horizontally, said second roller rotatably mounted to said frame for rotation about its axis of rotation and at a location to support the opposite end of said endless belt, at a lower elevation than said first roller,
   (f) means connecting said treadle to one of said rollers to rotate said one of said roller as the treadle is moved under the weight of an animal, the rotation of said one of said rollers moving the upper surface of the belt and the litter on this surface, and
   (g) a closure barrier connected to the frame and positioned over and generally orthogonal to a portion of the upper surface of the belt and transverse to the movement of the belt, the closure barrier having an opening adjacent to the upper surface of the belt to permit only the lower layer of litter adjacent to the belt to pass through the opening, thereby passing primarily spent litter located in the lower layer of litter, while retaining primarily unused litter located above the opening in the closure barrier.

2. Apparatus as claimed in claim 1, further comprising a hopper connected to the frame for support and having an upper and lower opening, the upper opening being designed to accept litter, while the lower opening is designed to deposit the litter by gravity feed, the lower opening being located over and adjacent to the upper surface of the belt at a position forward of the closure barrier with respect to the movement of the upper surface of the belt, the hopper automatically depositing litter by gravity feed as the movement of the belt moves litter away from under the lower opening of the hopper.

3. Apparatus as claimed in claim 2, further comprising a flap closure covering the opening in the closure barrier and attached to and supported by the closure barrier at a point away from the upper surface of the belt to provide freedom of movement of the flap closure at the upper surface of the belt to pass the lower layer of primarily spent litter, and said apparatus further comprising a resilient means, connecting the lower portion of the flap closure to bias the flap towards complete closure of the opening in the closure barrier once the belt movement has been terminated.

4. Apparatus as claimed in claim 2, wherein the means for connecting said treadle to one of said rollers comprises a first set of gear teeth on the treadle and a second matching set of gear teeth for engagement with the first set of teeth being located on one of said rollers, the two sets of teeth being positioned to engage one another on the movement of the treadle from its initial position under the weight of the animal, and positioned for disengagement on returning to its initial position after removal of the weight of the animal.

5. Apparatus as claimed in claim 4, wherein the first set of gear teeth have a downward projection at their tips and the second set of gear teeth have an upward projection at their tips in the sector where the second set of teeth are intended to engage to provide for engagement of the two on the downward motion on the treadle and disengagement on the upward motion of the treadle.

6. Apparatus as claimed in claim 5, wherein the treadle is detachably connected to the frame for complete removal of the treadle to expose the litter on the upper surface of the belt for manual raking and removal of unburied waste.

7. Apparatus as claimed in claim 5, wherein the treadle is pivotally connected to the frame for rotation of the treadle clear of the frame to expose the litter on the upper surface of the belt for manual raking and removal.

8. Apparatus as claimed in claim 2, further comprising a resilient means connected to the treadle and to the frame for returning the treadle to its initial position after movement under the animal's weight.

9. Apparatus as claimed in claim 2, wherein the means for connecting said treadle to one of said rollers comprises a set of gear teeth being located on one of said rollers and a ratchet pall on said treadle, bias means for urging the pall into engagement with the gear teeth on the downward stroke of the pall under the weight of the animal and for withdrawing the pall from engagement on the upward stroke after removal of the weight of the animal.

10. Apparatus as claimed in claim 3, wherein said resilient means is contained in the flap closure.

11. Apparatus as claimed in claim 10, wherein the material forming the flap closure also forms the resilient means.

12. Apparatus as claimed in claim 1 wherein said apparatus further comprises a resilient means for returning the treadle to its initial position after the weight of the animal has been removed, and wherein said means for connecting said treadle to one of said rollers occurs only on the return of said treadle to its original position after removal of the weight of the animal to move the litter only after the animal has departed said apparatus.

13. Apparatus for removing spent animal litter, comprising:
   (a) a frame,
   (b) a treadle movably mounted to said frame for accepting an animal's weight and said treadle positioned to move under the force of said weight,
   (c) a drum having an axis of rotation positioned generally horizontally and a portion of its surface having a circular cross section referred to as its upper surface, said drum being mounted to said frame for rotation about its axis of rotation, and said drum being positioned to support animal litter on its upper surface,
   (d) means for connecting said treadle to said drum to rotate said drum as the treadle is moved under the weight of an animal, the rotation of said drum moving the upper surface of drum and the litter on this surface, and
   (e) a closure barrier connected to the frame and positioned over and generally orthogonal to a portion of the upper surface of the drum and transverse to the movement of the drum, the closure barrier having an opening adjacent to the upper surface of the drum to permit only the lower layer of litter adjacent to the drum to pass through the opening in the closure barrier, thereby passing primarily spent litter located in the lower layer of litter, while retaining primarily unused litter located above the opening in the closure barrier.

14. Apparatus as claimed in claim 13, wherein said apparatus further comprises a resilient means connected to the treadle and the frame for returning the treadle to its initial position after the weight of the animal has been removed, and wherein the means for connecting said treadle to said drum occurs only on the return of said treadle to its original position to move the litter only after the animal has departed said apparatus.

15. Apparatus as claimed in claim 14, further comprising a first and a second disc having diameters larger than said drum, each of said discs being concentrically attached to an opposite side of said drum to form side walls to contain the litter on the upper surface of said drum.

16. Apparatus as claimed in claim 15, wherein said means for connecting said treadle to said drum comprises a drive arm connected to said treadle and said drive arm being positioned to engage the periphery of one of said discs to move said drum on the movement of said treadle.

* * * * *